United States Patent [19]
Nishijima et al.

[11] Patent Number: 5,295,035
[45] Date of Patent: Mar. 15, 1994

[54] POWER DISTRIBUTION LINE PROTECTION SYSTEM

[75] Inventors: Kazuo Nishijima, Katsuta; Terunobu Miyazaki, Ibaraki; Mitsuru Nakamura, Katsuta, all of Japan

[73] Assignee: Hitachi, Ltd., Tokyo, Japan

[21] Appl. No.: 961,320

[22] Filed: Oct. 15, 1992

[30] Foreign Application Priority Data

Oct. 21, 1991 [JP] Japan .................. 3-272329

[51] Int. Cl.$^5$ .............................................. H02H 3/16
[52] U.S. Cl. ........................................ 361/63; 361/67
[58] Field of Search .......... 361/67, 63, 70, 75, 361/59; 324/522

[56] References Cited

U.S. PATENT DOCUMENTS 4,439,803  3/1984  Baba .................................... 361/63
4,933,802  6/1990  Haginoya et al. .................. 361/67

OTHER PUBLICATIONS

"Denki Kagaku Handbook", The Institute of Electrical Engineers of Japan, Feb. 1988, p. 1264.

"Haiden Gijutsu Sougou Manual", 1st Ed., Ohm-sha pp. 462-467, no date.

Primary Examiner—Todd E. DeBoer
Attorney, Agent, or Firm—Antonelli, Terry, Stout & Kraus

[57] ABSTRACT

A plurality of switches are arranged in a distributive manner on a distribution line connected to a power distribution substation, and the switches are connected respectively to fault detection relays. Each of the fault detection relays includes a memory circuit for holding a voltage resulting from a ground fault on the distribution line, and the time constants of the memory circuits are set to become greater in an ascending order from the power outlet of the distribution line. Owing to difference in the time constants, there are differences in the holding voltage of the memory circuits resulting from intermittent ground faults which precede a full ground fault. By utilizing the differences of holding voltage, the switch closest to the full ground fault as viewed from the power outlet of the distribution line is the first to open the circuit.

5 Claims, 5 Drawing Sheets

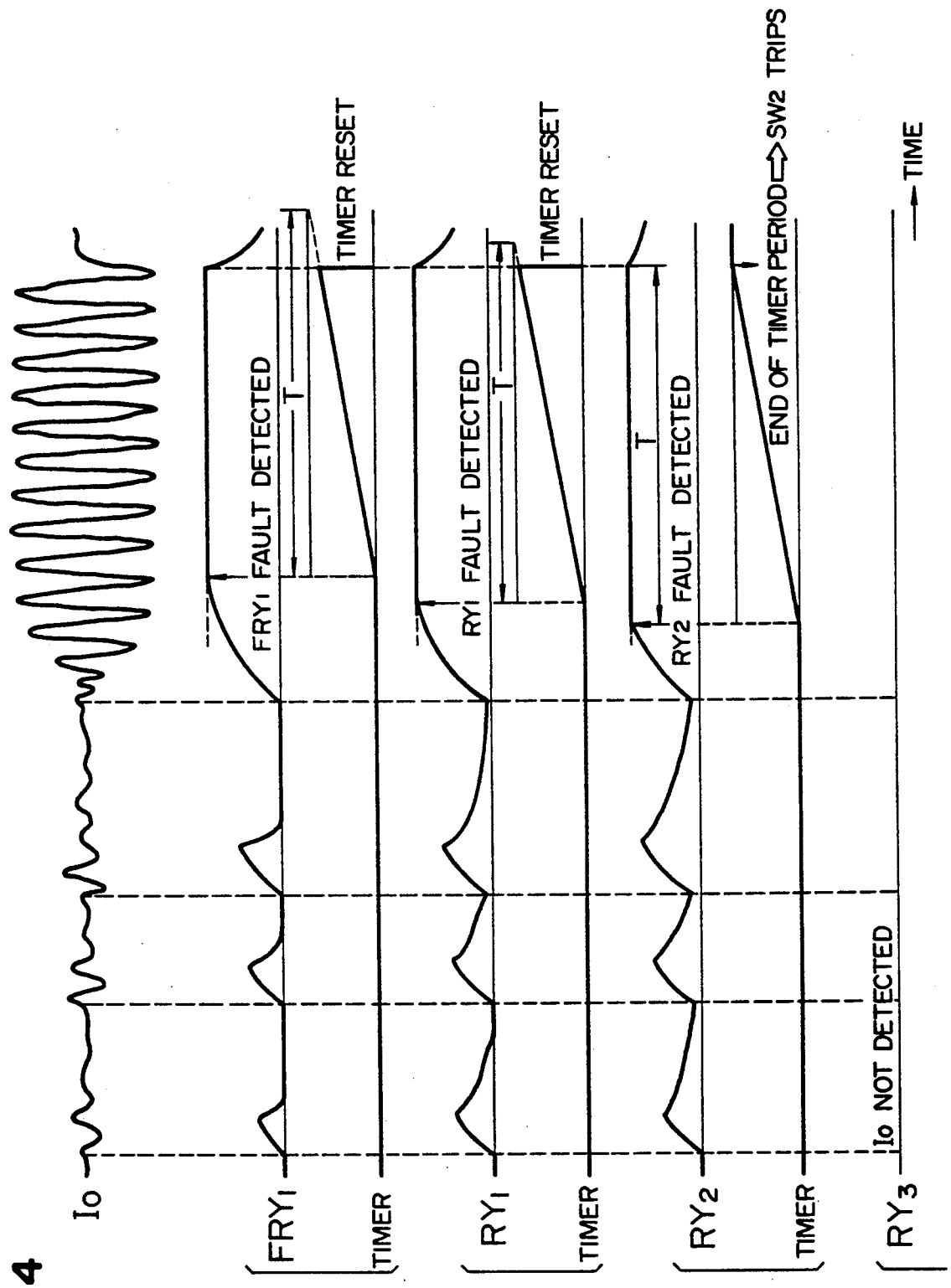

POWER DISTRIBUTION LINE PROTECTION SYSTEM

BACKGROUND OF THE INVENTION

This invention relates to a power distribution line protection system, and more particularly to a protection and coordination method of a fault detection relay provided at the power outlet from a substation to a distribution line and fault detection relays arranged on the distribution line in the protection system.

In order to quickly discriminate an affected section from sound sections of a distribution line upon occurrence of a fault on the distribution line, conventionally "section switches for automatic detection of the affected section" has been used (e.g., "Denki Kogaku Handbook (Electric Engineering Handbook)" published by the Institute of Electrical Engineers of Japan, February, 1988, page 1264). According to this handbook, after all section switches are opened upon occurrence of the fault, they are automatically closed one after another at preset time intervals. At the moment the fault detection relay installed at the power outlet from a substation to the distribution line involved in the fault detects the fault, a relevant breaker at the power outlet of the distribution line opens. From the section switch which was closed just before the above-mentioned operation, the section that the fault exists can be identified. This is generally called the time delayed sequential circuit closing system. The time delayed sequential circuit closing system is also disclosed in "Haiden Gijutsu Sougou Manual (General Manual for Power Distribution Technology), first edition, Ohm-sha, pp. 462–467.

According to the conventional time delayed sequential circuit closing system, there is a possibility that some sound section can be involved in the power service interruption caused by the fault, and time of (the number of switches having the time delayed sequential circuit closing function)×(circuit closing interval (e.g., in minutes)) is required for completing the power transmission up to the end of the distribution line. A resulting problem is that the power failure time is longer for the areas closer to the end of the distribution line. If the number of switches with the time delayed sequential circuit closing function is reduced to shorten the power interruption time, a protected section (power-interrupted section) will become longer. The time delayed sequential circuit closing system has a problem that the sound sections may suffer power interruption time twice, that is, a power interruption when a fault occurs and a power interruption when the affected section is detected.

SUMMARY OF THE INVENTION

An object of the present invention is to provide a distribution line protective system for minimizing power interruption in the sound sections necessary to detect and isolate the affected section of the distribution line.

Another object of the present invention is to provide a distribution line protective system for power interruption, which isolates the affected section while keeping the current power distribution system in operation, that is to say, which enables the power interruption time to be shortened by decreasing the time required for time delayed sequential circuit closing.

In order to achieve the above objects, in the distribution line protective system for power interruption according to the present invention, switches are arranged in a distributed manner on a distribution line, and each switch is provided with a protection equipment incorporating a fault detection relay to detect a fault in a section of the distribution line. Each of the fault detection relays comprises a memory circuit to determine its own fault detection sensitivity to an electric input (zero phase current Io, or zero-phase voltage Vo, for example) to be received. In order to coordinate the operation of the fault detection relays (including one provided at the power outlet from the substation), different degrees of action sensitivity are given to the relays such that the capacity (time constant) of the memories becomes greater as the relays go away from the power source end of the distribution line.

In the above-mentioned arrangement, each switch opens the circuit by the action of the fault detection relay included in a protection equipment having a circuit re-closing function. In addition, to coordinate the operation of the fault detection relays, the electric input memory function of the memory circuits is made greater for the relays farther from the power source end so that the relays have different action sensitivity.

As in a fault for example owing to the deterioration of the insulating material, most of the ground faults of the distribution line have a promontory phenomenon (intermittent ground faults) before proceeding to a complete ground fault. Therefore, the greater the memory function of the electric input (zero phase current Io or zero-phase voltage Vo, for example) in a memory circuit, the more easily the associated fault detection relay operates. In other words, on the substation power outlet side, the fault detection relay closest to the point of a fault quickly operates to open the switch concerned.

As a result, the switches on the power source side from the opened switch do not operate, thereby avoiding a power interruption of the sound sections.

Hereafter, the opened switch is re-closed by the circuit re-closing function of the protection equipment, and the affected section is isolated by for example the conventional time delayed sequential circuit closing system.

The above-mentioned another object of the present invention is achieved, preferably, by a power distribution line protection system for power interruption, wherein the time period from the re-closing time after a fault by a fault detecting relay to the start time of its re-trip action is made shorter than that from its fault detection time to its trip action start time.

BRIEF DESCRIPTION OF THE DRAWINGS

FIG. 4 is a time chart showing the operation of the embodiment shown in FIG. 1 when a fault occurs including intermittent ground faults;

DESCRIPTION OF THE PREFERRED EMBODIMENT

The present invention will be described with reference to a preferred embodiment.

Figure 1:
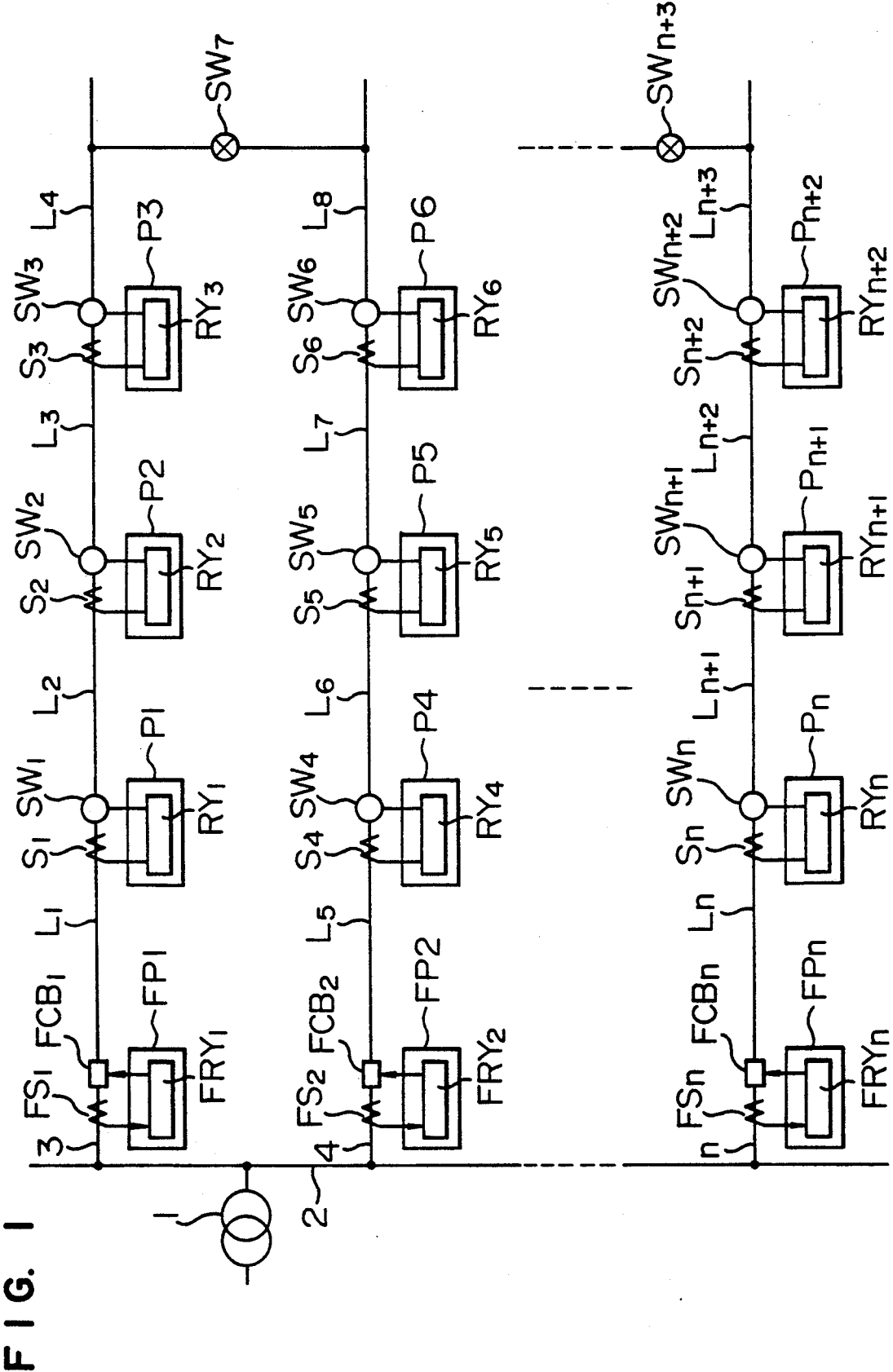
FIG. 1 is a diagram showing a general configuration of distribution line circuitry as an embodiment of the present invention.

FIG. 1 is a configuration of a 6.6-kV distribution line system to which the present invention is applied. As illustrated, a plurality of distribution lines 3, 4, . . . , and n are connected through a 6.6-kV distribution bus 2 to a transformer 1 at a substation. At the substation feeding points of those distribution lines, there are provided feeding outlet breakers FCB1, FCB2, . . . , FCBn.

On the distribution line, section switches SW1 to SW3 are distributively arranged, and, similarly, section switches SW4 to SW6 are arranged, thereby forming sections L1 to L8. The distribution sections L4 and L8 can be connected by a switch SW7, so that power can be supplied to either distribution line as necessity requires.

Protection equipments FP1 and P1 to P3 are provided with the switches FCB1 and SW1 to SW3 on the distribution line 3, respectively. The protection equipments FP1 and P1 to P3 include fault detection relays FRY1 and RY1 to RY3, respectively. Fault detection sensors FS1, S1 to S3 are provided at the installation points of the switches FCB1, SW1 to SW3 on the distribution line 3. As those sensors, current transformers and voltage transformers are used. Electricity quantities (zero phase current Io, zero-phase voltage Vo, for example) of the distribution line, detected by the sensors, are inputted to the corresponding fault detection relays FRY1, RY1 to RY3. As the fault detection relays, the ground directional relay, the zero-phase over-current relay, the zero-phase overvoltage relay, for example, are mounted as the occasion demands.

Figure 2:
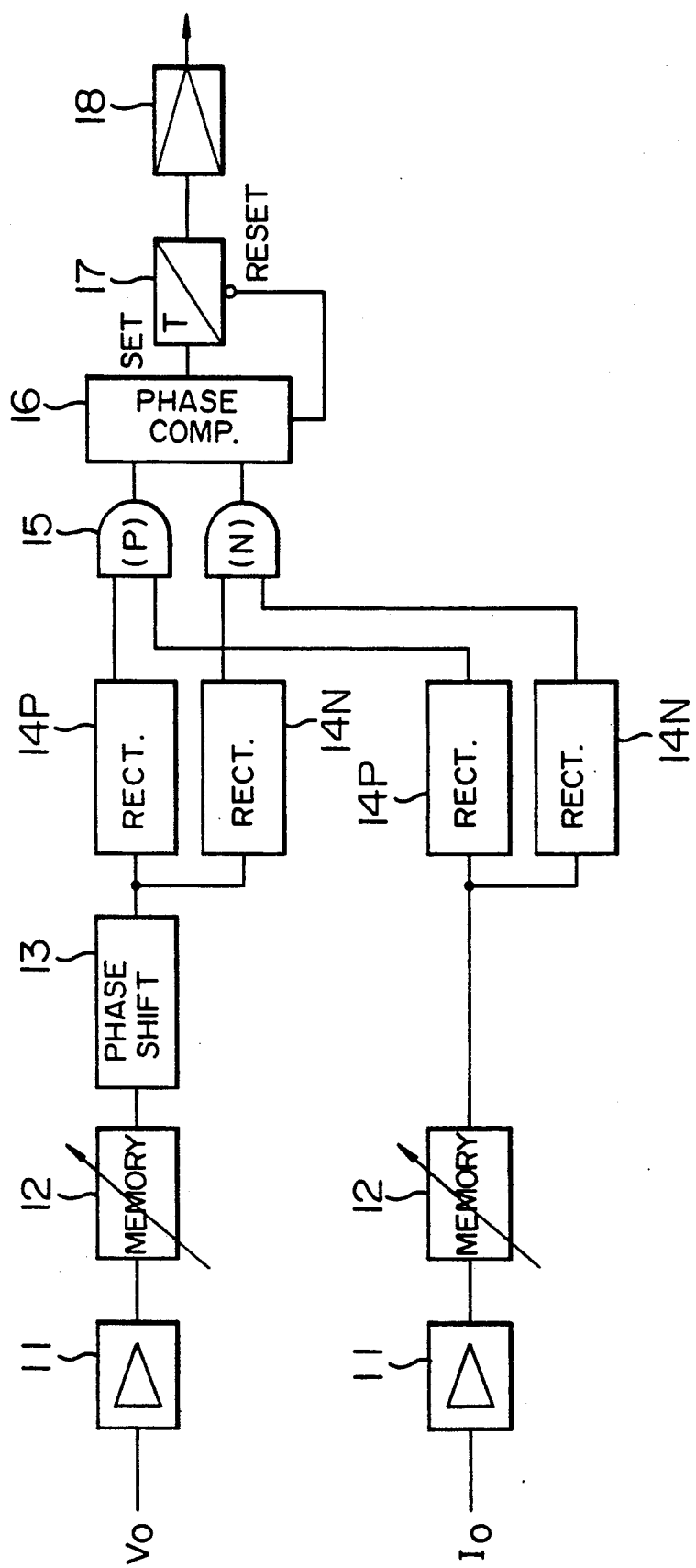
FIG. 2 is a block diagram showing a structural example of a fault detection relay shown in FIG. 1.
Figure 3:
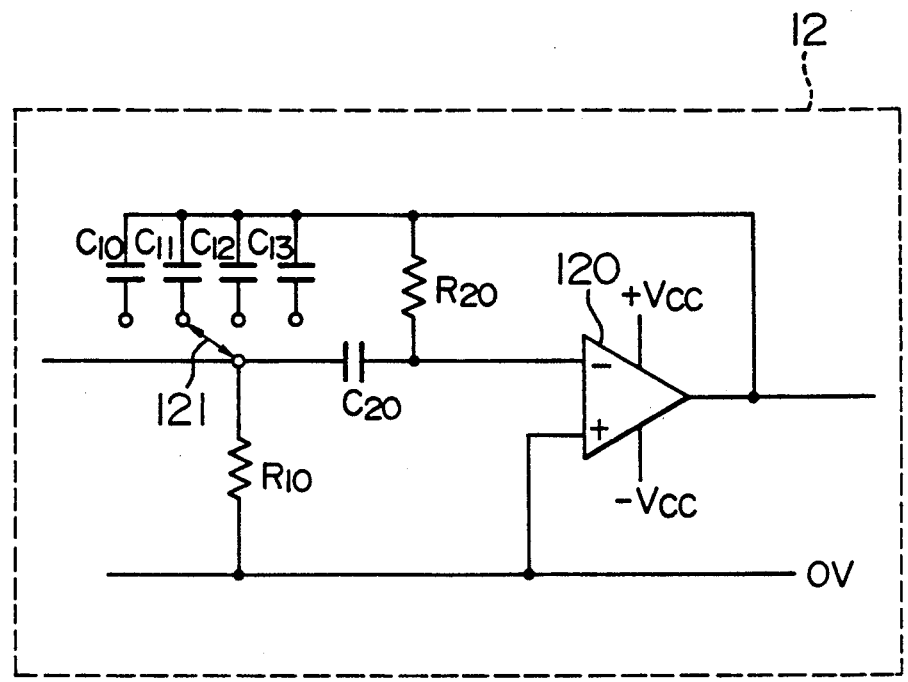
FIG. 3 is a schematic diagram showing a configuration example of a memory circuit 12 shown in FIG. 2.

An example of the fault detection relay is shown in FIG. 2. In FIG. 2, the zero-phase voltage Vo on the distribution line is inputted to a memory circuit 12 through a filter 11. Output of the memory circuit 12 is inputted to a phase shifter circuit 13 for obtaining a phase angle for maximum sensitivity, and then shaped into a rectangular wave for phase comparison. Numeral 14P denotes a rectangular wave circuit for positive wave components, and 14N denotes a rectangular wave circuit for negative wave components. On the other hand, like the zero-phase voltage, the zero phase current Io on the distribution line is also shaped into a rectangular wave after passing a filter circuit 11 and a memory circuit 12. Rectangular wave signals of the zero-phase voltage and the zero phase current are passed through AND circuits 15. Then, a phase comparison circuit 16 decides whether a fault has occurred in the sections under protection, and after a delay for a predetermined time (T in FIG. 4) by an operation timer 17, a switch opening (trip) signal is output by a driver circuit 18. An example of the memory circuit 12 in FIG. 2 is shown in FIG. 3. In FIG. 3, there is shown an integrating circuit using an operational amplifier 120. Capacitors C10 to C13 have different capacities, and one of the capacitors is selected by a selector 121. By the selected capacitor, a capacitor C20, and resistances R10 and R20, a time constant Q is determined. With this arrangement, memory circuits of the same structure can be used for different fault detection relays. By selection of capacitors by the selector 121, the time constant Q can be varied.

In the above-mentioned fault detection relays, the time constants Q of the memory circuits 12 are greater as the relays go farther away from the power source end of the distribution line. If the time constants Q of the fault detection relays FRY1, RY1, RY2, and RY3 are QFRY1, QRY1, QRY2, and QRY3, the following relation holds in this embodiment:

$$QFRY1 < QRY1 < QRY2 < QRY3$$

As for a ground fault on the distribution line, intermittent ground fault precedes a full-fledged ground fault. As the intermittent ground faults occur, the memory circuits 12 store voltages according to their time constants. Therefore, the embodiment thus arranged operates such that only a switch closest to the point of the fault opens as shown in the time chart in FIG. 4.

FIG. 4 presents a case where a ground fault occurred in the section L3 (in FIG. 1), and in this case, a ground charging current (zero phase current) Io flows toward the point of the ground fault. At this time, the fault detection relay RY3 does not operate, as the zero phase current Io flows in opposite phase into the RY3 (in an actual system, the ground electrostatic capacities of the sections from the section L3 on are generally small, and therefore, the zero phase current Io does not flow so much.)

Meanwhile, even when the same amount of zero phase current Io is inputted into the fault detection relays FRY1, RY1 and RY2 because of difference of the input holding time constants Q with different memory circuits, the larger the time constant Q, the more intermittent input the memory circuit holds and thus the more quickly the relay detects a full-fledged ground fault. Therefore, the fault detection relay RY2 is the first to cause the timer 17 for confirming the fault detection to start counting the elapsed time, and as its timer reaches the end of timer period earlier than the other fault detection relays FRY1 and RY1, the section switch SW2 is caused to trip. By this trip of the section switch SW2, the point of the fault is isolated, and the zero phase current Io is reset to the normal state. In consequence, in the other fault detection relays FRY1 and RY1, the fault detection elements or armatures are reset, and the timers are reset.

By the above-mentioned actions and the trip of the section switch SW2, the sound sections L1 and L2 on the power source side are kept in operation without interruption of power supply.

It ought to be noted that the protection equipments including the respective fault detection relays FRY1 and RY1 to RY3 are each provided with a re-closing device (not shown). In this embodiment, after the switch SW2 is opened by the fault detection relay, after the elapse of a fixed time, the switch SW2 is made to close again, so that the time delayed sequential circuit closing of the service-interrupted sections is carried out. If the fault is lasting, the switch SW2 is made to trip for the second time to close the circuit. The re-closing function is the same as in the re-closing device conventionally installed at the power outlet from the substation, and detailed description of its operation is omitted here.

As for the memory circuit (of holding time constant) of the fault detection circuit, in the above-described embodiment, the time constants are fixed values by prior setting, but the holding time constants Q may be increased proportionally or in steps according to the magnitude of the zero-phase voltage Vo or the zero phase current Io, and the operation of the fault detection relays may be coordinated in such a way that the proportional constant or the differences between steps increase as the relays go farther away from the power source end.

On the distribution lines, a residual zero phase voltage and a residual zero current are occurring in the single phase sections or owing to an imbalance of load. It goes without saying that when such a situation needs to be taken into account, the holding time constant Q has only to be varied according not to the magnitude of input as mentioned above but to the rate of change.

Obviously, when the holding time constants Q are changed according to the amount of input, the operation of the fault detection relays can be coordinated more easily also by reducing the operation time T.

In the foregoing, the isolation of the point of the fault considering a premonitory phenomenon (intermittent ground fault) has been discussed. However, when a circuit re-closing action is to be performed, the ground fault has developed into a full-fledged fault, so that the intermittent ground faults cannot be utilized. In this case, the section switches are closed sequentially by the time delayed sequential circuit closing system. But, there is a problem with the conventional time delayed sequential circuit closing system that the sound sections may suffer a power service interruption when the opened switch is re-closed.

Figure 5:
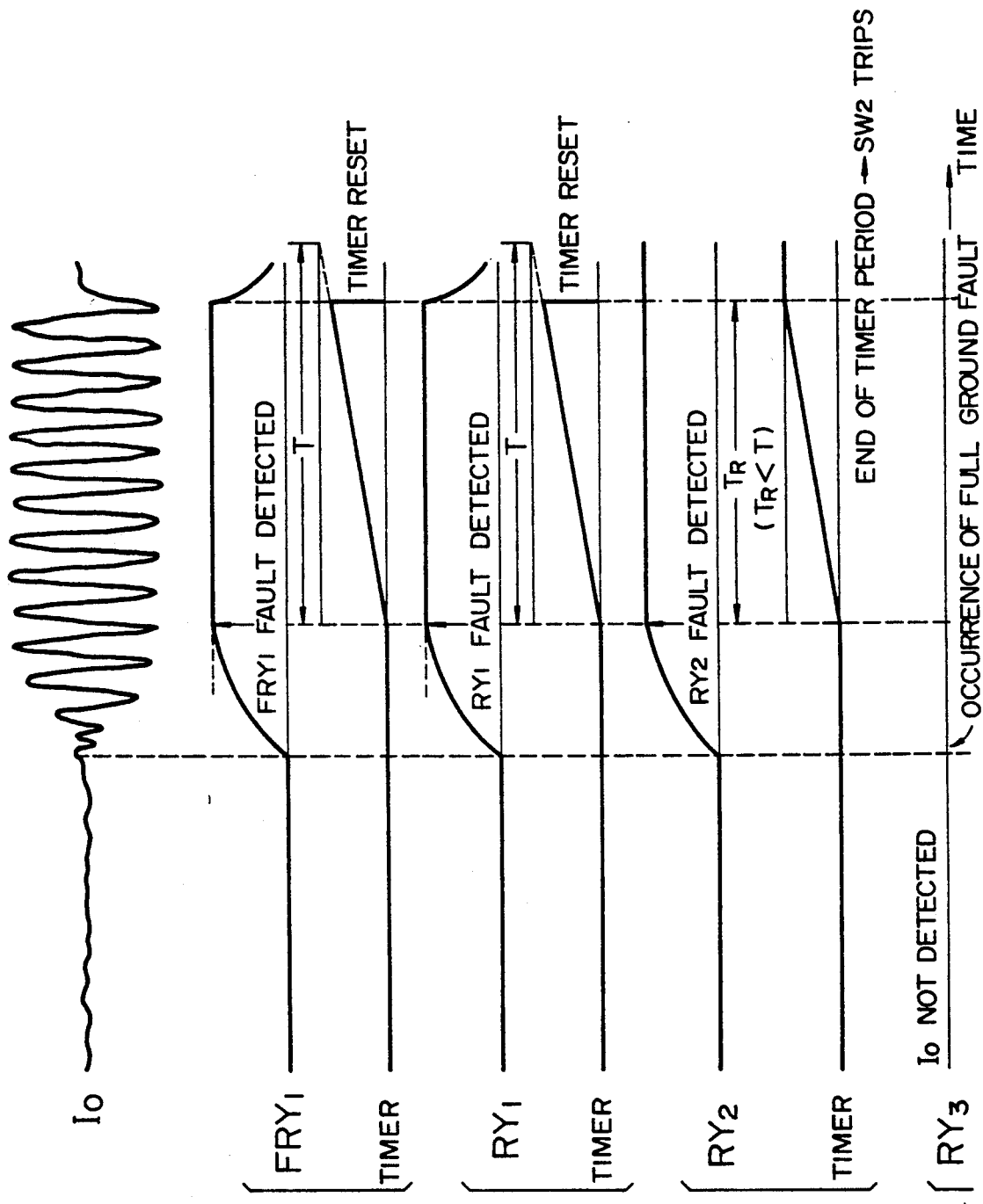
FIG. 5 is a time chart showing the operation of the embodiment shown in FIG. 1 when a fault occurs without intermittent ground fault.

In the embodiment of the present invention, to solve this problem, the operation time (T) of a fault detection relay is decreased to $T_R$ when the relevant section switch is re-closed. FIG. 5 shows a time chart showing the re-closing operation.

In FIG. 5, a case is supposed where a fault occurs in the section L3, and the fault detection relay RY2 re-closes the associated switch while the fault has not been recovered. When the fault detection relay RY2 re-closes the associated switch, the memory circuits of the fault detection relays FRY1, RY1 and RY2 have the holding voltages increased, and the relays detect the fault almost simultaneously, and activate their timers. When a fault detection relay RY2 receives information that it is in the re-closing state and it has still detected the fault, the fault detection relay RY2 re-trips the associated switch at the end of timer period $T_R$ shorter than the normal timer period T. Since the other fault detection relays FRY1 and RY1 do not operate until the end of normal timer period T, those relays are reset by the re-trip of the fault detection relay RY2 without opening the associated switches. By this arrangement, the sound sections are prevented from being subjected to a power service interruption.

Figure 6:
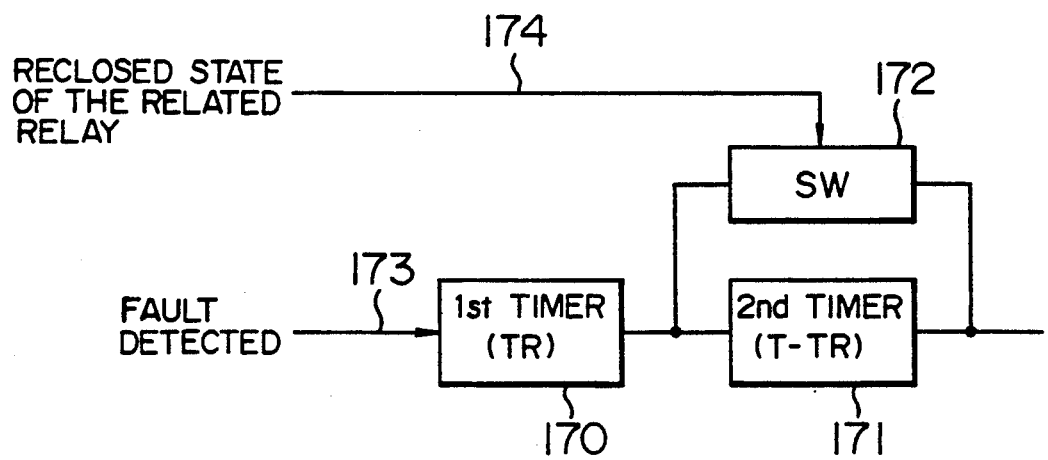
FIG. 6 is a block diagram showing a structural example of a timer in the fault detection relay to obtain the operation shown in FIG. 5.

FIG. 6 shows an example of a timer circuit 17 which performs the action as described above. In FIG. 6, if delay times of first and second timers 170 and 171 are put together, a delay time T is obtained. In response to a signal 174 representing that its own fault detection relay is in the re-closing state, a switch 172 bypasses output of the first timer 170 by avoiding the passage through the second timer 171 (or disables the second timer 171). When a fault detection signal 173 is applied to the first timer 170, after an elapsed time of $T_R$, a re-trip signal is issued.

If its own relay is not in the circuit re-closing state, the related switch 172 does not operate, so that the timer period becomes T.

In such a case as in FIG. 6, whether the timer is an analog timer or a soft timer, it is only necessary to switch the length of delay time by a activating signal of the circuit re-closing function.

Further, the re-trip action is obtained not only by reducing the operation time of a fault detection relay at the re-closing time. It is also possible to increase the sensitivity of a fault detection relay at the re-closing time.

This invention has been described on the assumption that the distribution line switches are used as they are. It is possible to provide a trip block using an over-current relay to protect the switches when a fault occurs, but this is not directly related to the present invention, and its description is omitted. Needless to say, if switches with high breaking capacity are used, there is no such a problem of protection against over-current.

As has been described, according to the present invention, the operation of the fault detection relays is coordinated in such a way that the holding time constants of the input signal memory circuits of the fault detection relays installed in the switches become greater as the switches go away from the power source of the distribution line, so that when a fault occurs, the switch closest to the point of fault is opened to isolate the affected section, and therefore, the switches on the power source end side from the opened switch do not operate.

By this arrangement, the power service interruption of the sound sections is avoided or reduced substantially to zero. In addition, the fault detection relay installed at each switch independently works to isolate the point of fault, and therefore, the provision of a pilot wire or anything else is not required, and the current system can be used as it is.

As a result, the isolation of the section affected by an fault can be done in a short time, with the result that the time delayed sequential circuit closing or the diversion of power from another distribution line can be implemented quickly, and generally, the service interruption time can be shortened.

We claim:

1. A power distribution line protection system comprising:
   a distribution line connected to a power distribution substation;
   a plurality of switches arranged distributively on said distribution line; and
   a plurality of protection equipments including a plurality of fault detection relays, respectively, each of said fault detection relays being connected to each of said plurality of switches, for on/off control thereof,
   wherein each of said fault detection relays includes memory means for holding a voltage resulting from a ground fault on said distribution line;
   wherein time constants of said memory means are set to become greater in an ascending order from the power outlet of said distribution line; and
   wherein according to different holding voltages at the memory means resulting from intermittent ground faults prior to a full ground fault, a switch is opened which is closest to the full ground fault as viewed from said power outlet.

2. A power distribution line protection system according to claim 1, wherein each of said fault detection relays includes:

means for detecting said full ground fault when the holding voltage of said memory means exceeds a predetermined voltage;

timer means for starting counting of an elapse of time in response to detection of said full ground fault by said detecting means and confirming an occurrence of said full ground fault after a predetermined time; and means for opening said related switch in response to confirmation of occurrence of said full fault by said timer.

3. A power distribution line protection system according to claim 2, wherein each of said protection equipments has a re-closing function after said full ground fault; and wherein said timer means related to said switch opened by said full ground fault includes means for shortening said predetermined time to another predetermined time in response to a signal representing that the fault detection relay related to said timer means is in a re-closing state.

4. A power distribution line protection system according to claim 2, wherein a memory effect of an electric input signal in each of said memory means can be varied proportionally or incrementally according to the magnitude of electric input.

5. A power distribution line protection system according to claim 2, wherein a memory effect of an electric input signal in each of said memory means can be varied proportionally or incrementally according to the rate of change of electric input.

* * * * *